March 10, 1925.   1,528,750
W. J. BAZAREK
TIRE TOOL
Filed Oct. 18, 1923
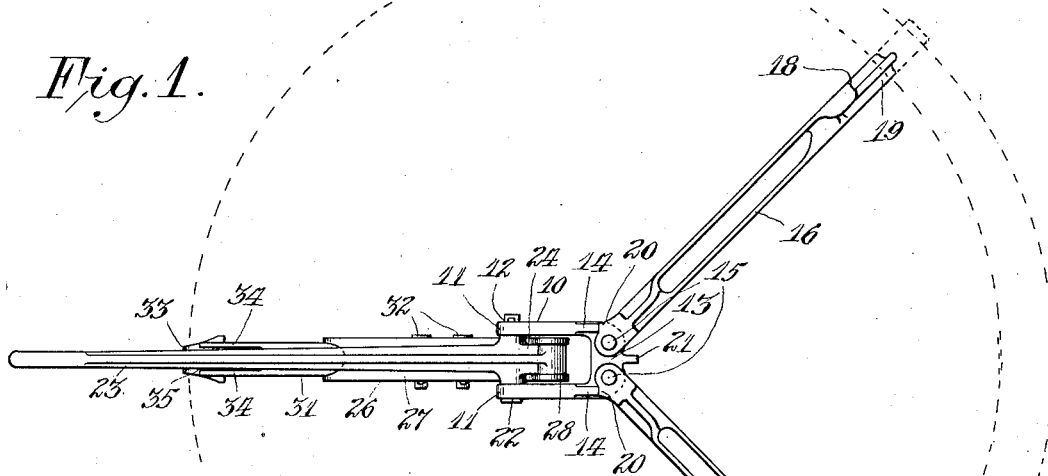
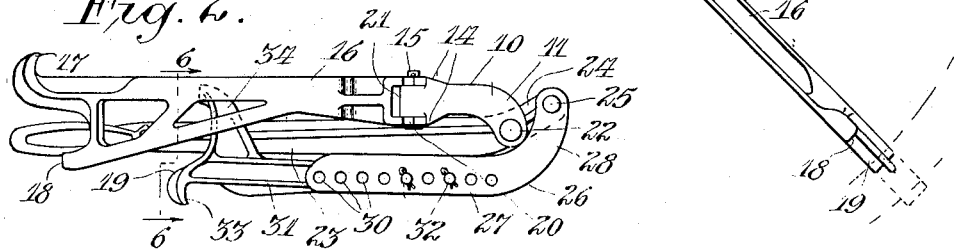
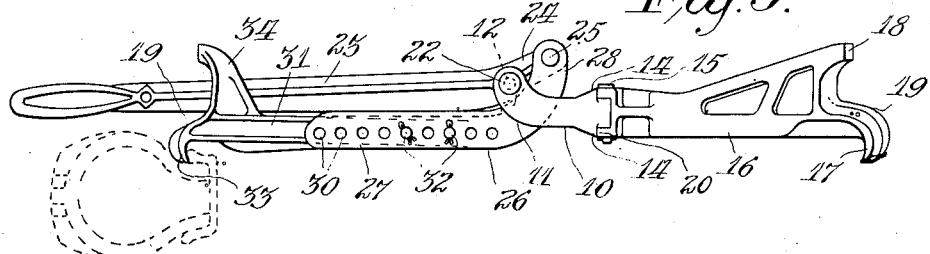
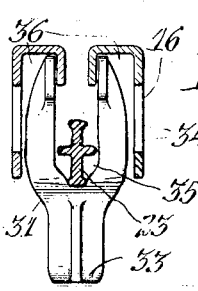
Inventor:
Waldo J. Bazarek,
By Sprinkle & Smith
Attys

Patented Mar. 10, 1925.

1,528,750

UNITED STATES PATENT OFFICE.

WALDO J. BAZAREK, OF BELVIDERE, ILLINOIS.

TIRE TOOL.

Application filed October 18, 1923. Serial No. 669,229.

*To all whom it may concern:*

Be it known that I, WALDO J. BAZAREK, a citizen of the United States, residing at Belvidere, in the county of Boone and State of Illinois, have invented certain new and useful Improvements in Tire Tools, of which the following is a specification.

This invention relates to a tire tool and more particularly to a device for contracting and expanding an automobile tire rim of the split rim type in connection with the removal or mounting of automobile tires.

One of the objects of the present invention is to provide a very simple and efficient tire tool.

A further object of the invention is to provide a tool which can be readily folded in such a manner as to be compact in form so that it will occupy a minimum amount of space in the tool box with the other tools ordinarily carried in an automobile.

A still further object of the invention is to provide a tire tool which can expand or contract a rim by a single oscillation of the lever.

A still further object of the invention is to provide a tire tool which can be easily adjusted to accommodate automobile tire rims of different sizes.

These and other objects are accomplished by providing a construction and arrangement of the various parts in the manner hereinafter described and particularly pointed out in the appended claims.

Referring to the drawings, Fig. 1 is a top plan view of my improved tire tool showing the manner in which it is applied to an automobile rim;

Fig. 2 shows the manner in which my improved tire tool may be folded so that the same will occupy a minimum amount of space;

Fig. 3 is a side elevational view showing my tire tool in its contracted position in which the rim is contracted so that the tire may be removed from the same;

Fig. 4 is a side elevational view showing my tire tool actuated to its expanding position or the position in which it is swung to expand the rim after the tire has been mounted on the same;

Fig. 5 is a cross sectional view taken on the lines 5—5 in Fig. 4 showing the construction by means of which my tire tool may be adjusted to accommodate rims of different sizes, and Fig. 6 is a cross sectional view taken on the lines 6—6 in Fig. 2 looking in the direction of the arrows.

In carrying out my invention I have shown the same comprising a main or central body member 10 of substantially U-shaped construction having two oppositely disposed and upwardly curved ears 11 provided with transversely aligned apertures 12. Formed integrally with the main body member 10 and on the end opposite the ears 11 is a horizontal portion 13. Extending through this horizontal portion 13 and on the opposite sides thereof are two apertures. The axes of these apertures are located at right angles to the axes of the aligned apertures 12 in the ears 11 of the member 10. Positioned adjacent the apertures in the horizontal portion 13 are shoulders or stops 14 for the purpose hereinafter set forth. Pivotally mounted in the apertures of the horizontal portion 13 by means of bolts 15 are two normally diverging rim engaging members 16. The free end of the rim engaging members 16 are provided with on one side thereof rim contracting hook portions 17 and on the other side thereof rim expanding portions 18. It will of course be understood that the rim contracting hook portions 17 are so formed as to engage the outer edge of the periphery of the rim in such a manner as to insure a positive grip on the rim when the tool is used for contracting the rim, and it will further be understood that when the tool is used in connection with expanding the rim, expanding portion 18 contacts the rim at a point sufficiently above the medial line of the rim so as to preclude the possibility of permitting the rim to slip off over the end of the rim expanding portion 18. In this connection, it will be understood that the rim is so arranged or seated on the tire tool that one edge thereof engages or rests on a portion 19 formed on the back of the hook 17 in such a manner as to prevent the rim from sliding off in the direction of the hook, as clearly shown in Fig. 4. Each of the rim engaging members 16 are limited in their lateral pivoted movement about their pivots on the bolt 15 by means of stops 20 which are formed integrally with these members on one side thereof and adapted to engage the shoulders 14 formed on the horizontal portion 13 of the main body member 10. In order to prevent the rim engaging members 16 from swinging past their normal parallel positions I have provided a lug 21 which is formed integrally with the member 10 and extends between these members in a manner to engage the sides of the rim engaging member and act as a stop therefor. This construction, it will of course be understood, permits these members to swing from substantial parallelism to a diverging position or the position shown in Fig. 1 wherein the stops 20 engage the shoulders 14 and thereby lock these rim engaging members against further diverging movement. This feature is very essential to the successful operation of a tire tool of this type in that it distributes the contracting and expanding force equally around the rim. Pivotally mounted on the ears 11 of the main body member 10 by means of a bolt 22 is a hand operating lever 23. The lever 23 is provided with a tail portion 24 which extends beyond the pivot 22 of the lever 23. Pivotally connected to the free end of the tail portion 24 at 25 is another rim engaging member 26.

In order to permit my tire tool to be used in connection with rims and tires of different sizes I have provided means for adjusting the same, which comprises a member 27 which has one end thereof turned up or curved as shown at 28 and pivotally connected at 25, as previously described. The free end of the member 27 is a channel construction, as clearly shown in Fig. 5, having vertical flanges 29 on the opposite sides thereof. Extending through the flanges 29 of the member 27 are a plurality of apertures 30 for the purpose hereinafter set forth. Slidably mounted in the channel of the member 27 between the flanges 29 is a rim engaging member 31. The end of the member 31 engaging the channel member 27 is provided with two apertures which are adapted to receive pins 32, when aligned with two corresponding apertures in the member 27.

From the above description it will be seen that when it is desired to adapt my tire tool to the various sizes of rims, the rim engaging member 31 is adjusted so that both of the apertures in the member 31 register with any corresponding two apertures 30 in the member 27 and then the pins and cotters 32 are inserted, which secures both these members rigidly together. The rim engaging member 31 is provided on its outer end thereof with the rim contracting hook portion 33 which is similar in structure to the hook portions 17 formed on the outer end of the rim engaging members 16. Formed on the rim engaging member 31 on the side opposite the hook 33 are two rim expanding portions 34. These rim expanding portions 34 are positioned on the opposite sides in such a manner as to form substantially a channel 35 therebetween. The object of separating these rim expanding portions 34 so as to form a channel 35 is to permit the lever to be swung into this channel between these tire expanding members and thereby lock the lever past dead center, as clearly shown in Fig. 3 when the tire tool is used in connection with contracting a rim. In this connection, it will be noted that I have slightly angled the tail portion 24 of the lever 23 so that the lever will be positively locked over dead center when in this position. Another reason for permitting the lever to be swung into the channel 35 between the rim expanding portion 34 is to permit the lever to be folded in substantial parallelism with the rim engaging members 16 when it is folded in its folded position as shown in Fig. 2. Of course, when it is folded in this position the main body member as well as the rim engaging members 16 are also folded to substantial parallelism about their respective pivots, as clearly shown in Fig. 2.

In order to permit the tire tool to be folded into a form as compact as possible I have provided a construction by means of which the rim expanding portions 34 of the rim engaging member 31 may be positioned in channels 36 of the rim engaging member 16, as clearly shown in Fig. 6.

In the operation of the above described device, it will be understood that when the tire tool is used in connection with contracting a rim the hook members 17 and 33 of the rim engaging members 16 and 31, respectively, are positioned to engage the outer periphery of the rim and the lever 23 is swung from the position shown in Fig. 4 to the position shown in Fig. 3, in which position the lever is locked over dead center and the tire engaging tool is contracted, thereby permitting the rim to be readily removed from the tire. If the tire tool is used in connection with expanding a rim, the tool is adjusted to the position shown in Fig. 3 and then swung to the position shown in Fig. 4, in which position the rim is forced or expanded to its proper position and locked in this position.

When the tire tool is used in connection with expanding a rim, it will of course be understood that the rim expanding portions together with their respective pivotal connections are so arranged with respect to the lever, that the lever does not become effective to expand the rim until it has reached a position slightly past the vertical. In other words, the downward stroke of the lever is effective to expand the rim engaging members and prevents the tool from buckling upwardly at the point of pivotal connection to the lever.

What I claim as my invention and desire to secure by Letters Patent is:

1. In a foldable tire tool the combination of a main body member, rim engaging members pivoted to said main body member for horizontal pivotal movement, stops formed on said main body member for limiting the pivotal movement of said rim engaging members whereby said rim engaging members are stopped in a diverging position, a lever pivoted to said body member, a third rim engaging member pivoted to said lever, said third rim engaging member and said main body member being curved so that the movement of the lever may throw the end of the third rim engaging member past dead center and whereby the main body member and said first mentioned rim engaging members may be folded to a position to be substantially coextensive with said third rim engaging member.

2. In a foldable tire tool, the combination of a U shaped member, rim engaging members pivoted to said U shaped member for horizontal pivotal movement, stops formed integrally with said U shaped member and engageable with said rim engaging members for limiting their pivotal movement to a diverging position, a lever pivoted to said U shaped member, a third rim engaging member and said U shaped member being curved so that the movement of the lever may throw the end of the third rim engaging member past dead center and whereby the U shaped and said first mentioned rim engaging members may be folded to a position to be substantially coextensive with said third rim engaging member.

3. A tire tool comprising a curved U shaped member, rim engaging members pivoted to the base of said U shaped member, stops for limiting the pivotal movement of said rim engaging members with respect to said U shaped member, a lever having a curved end pivoted to the open ends of said U shaped member, and a third rim engaging member having a curved end pivoted to the curved end of the said lever so that the movement of said lever may throw the end of the third rim engaging member within the U shaped member past dead center.

In testimony whereof I have signed my name to this specification, this 24th day of September, A. D. 1923.

WALDO J. BAZAREK.